May 15, 1962  R. B. HOBSON, JR  3,034,652
PRESSURE FILTER SHELL AND TUBE ASSEMBLY
Filed May 20, 1958  3 Sheets-Sheet 1
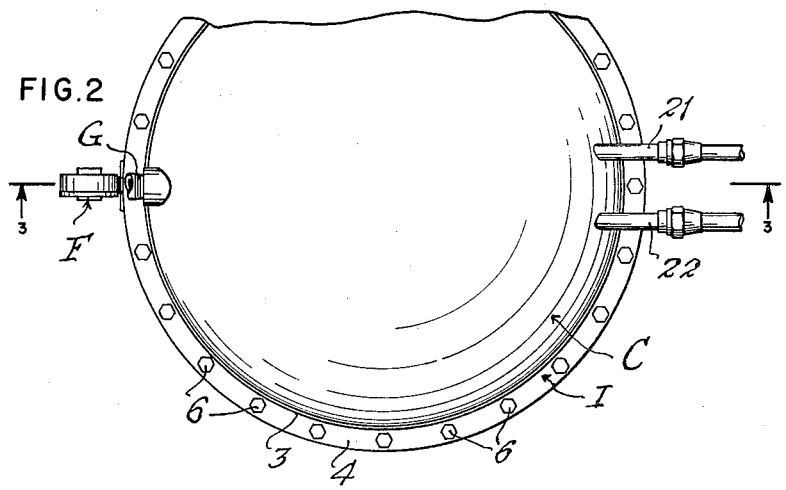
FIG. 2
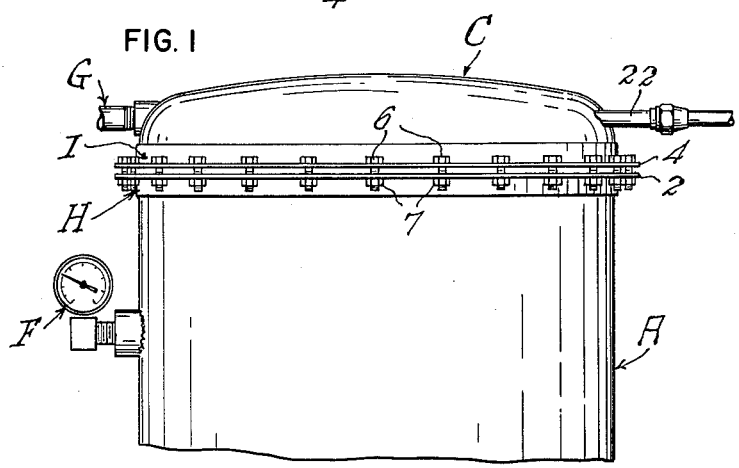
FIG. 1
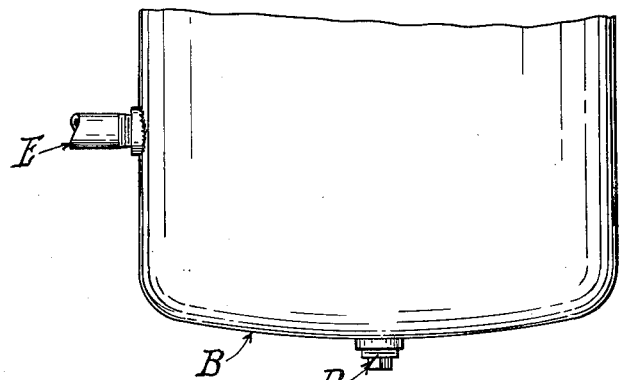
INVENTOR.
RUSSELL B. HOBSON, JR.
BY: Harry Brook,
ATTORNEY May 15, 1962 R. B. HOBSON, JR 3,034,652
PRESSURE FILTER SHELL AND TUBE ASSEMBLY
Filed May 20, 1958 3 Sheets-Sheet 2
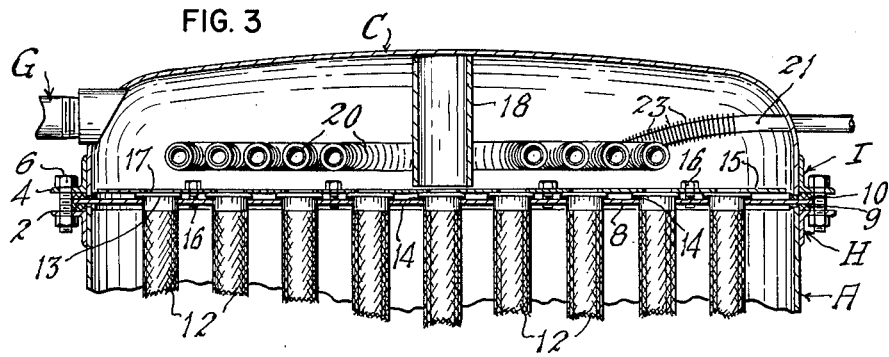
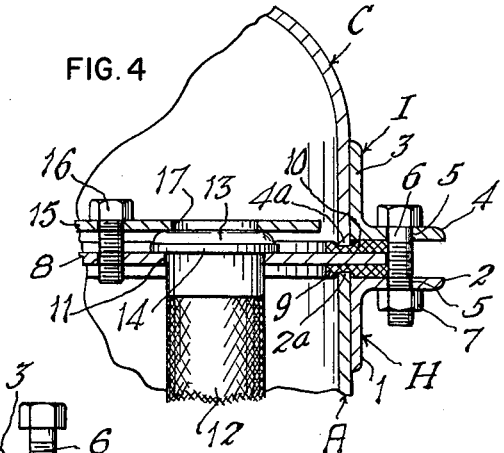
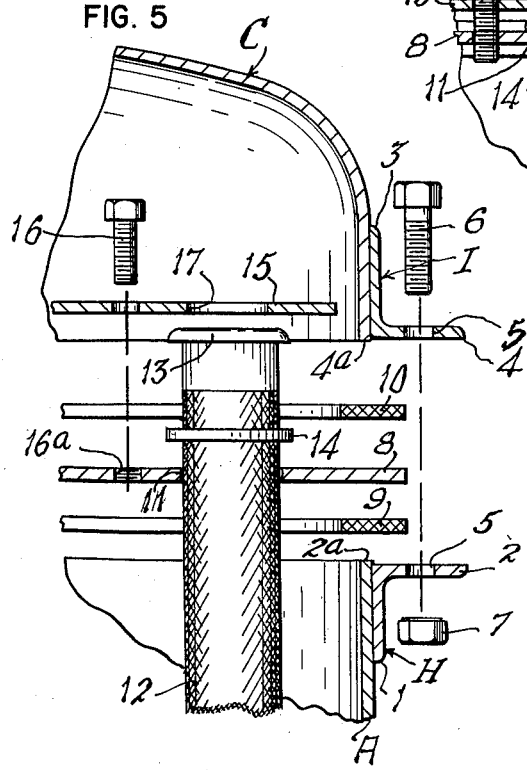
INVENTOR.
RUSSELL B. HOBSON, JR.
BY:
ATTORNEY May 15, 1962  R. B. HOBSON, JR  3,034,652
PRESSURE FILTER SHELL AND TUBE ASSEMBLY
Filed May 20, 1958  3 Sheets-Sheet 3

INVENTOR.
RUSSELL B. HOBSON, JR.
BY:
ATTORNEY

United States Patent Office 3,034,652
Patented May 15, 1962

3,034,652
PRESSURE FILTER SHELL AND TUBE ASSEMBLY
Russell B. Hobson, Jr., Montclair, N.J., assignor to Per Corporation, Orange, N.J., a corporation of New Jersey
Filed May 20, 1958, Ser. No. 736,507
2 Claims. (Cl. 210—232)

This invention relates in general to filters of the pressure type and especially to filters that are used in the recovery of solvents that have been utilized for dry cleaning garments and the like. More particularly the invention contemplates a filter which comprises a tank having a cylindrical shell-like side wall, a bottom wall at one end of said side wall, a removable shell-like dome-shaped cover at the other end of said side wall, and a tube sheet carrying a plurality of filter tubes and removably clamped between the edges of said side wall and said removable cover.

A primary object of the invention is to provide a filter of this type which shall include a novel and improved construction and combination of the cylindrical side wall, the tube sheet and the removable cover, whereby the tube sheet and tubes can be easily and quickly removed from the tank as a unit and the filter tubes can be easily and quickly removed from the tube sheet for any desired purpose such as inspection, cleaning or replacement.

Another object is to provide such a filter wherein there are an angular circumferential flange at the upper end of the cylindrical side wall and an angular circumferential flange at the edge of the dome-shaped cover between which are disposed the edge portions of the tube sheet and annular packing rings or gaskets, and fastening elements, such as bolts, tightly clamp said flanges together with said tube sheet and gaskets firmly pressed into fluid-tight relation with each other and with said flanges.

In the operation of such stills, the liquid to be filtered is usually mixed with steam and introduced under pressure into the lower end of the tank and through the filter tubes, and the filtrate, is forced from the upper ends of the filter tubes and thence through an outlet pipe in which is connected a cooling apparatus for cooling the filtrate. This construction is unnecessarily complicated and expensive. A further object of the invention is to provide a novel and improved construction and combination of a filtrate cooling apparatus with the tank and which shall comprise a cooling coil mounted in the dome-shaped cover in juxtaposition to the outlet ends of the filter tubes so that the filtrate liquid or vapor will pass into heat-exchanging contact with the cooling coil and thence to the outlet pipe.

Other advantages and results of the invention will be brought out by the following description in conjunction with the accompanying drawing in which—

FIGURE 1 is a side elevation of a filter of the pressure type embodying the invention.

FIGURE 2 is a top plan thereof with portions broken away.

FIGURE 3 is an enlarged fragmentary central vertical sectional view of the upper end of the filter, taken approximately on the plane of the line 3—3 of FIGURE 2.

FIGURE 4 is a further enlarged fragmentary vertical sectional view of portions of the flanges connecting the cover and side wall, and portions of the tube sheet and gaskets in assembled relation.

FIGURE 5 is an exploded vertical sectional view of the parts shown in FIGURE 4.

Figure 6:
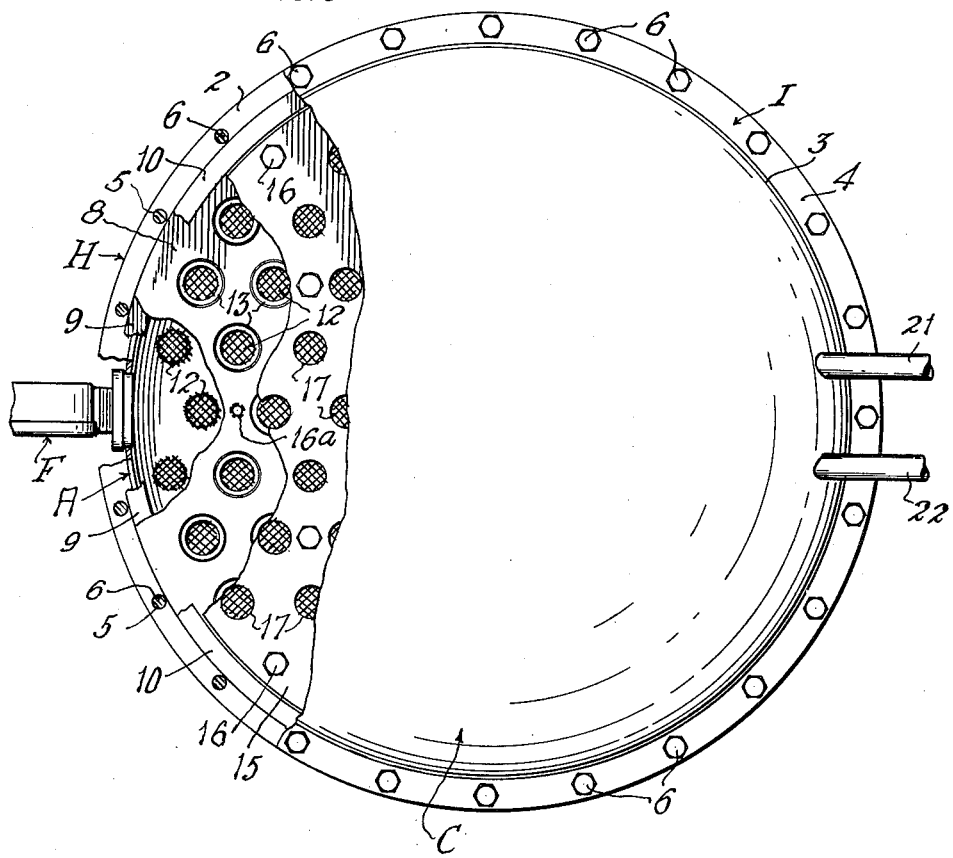
FIGURE 6 is an enlarged top plan view of the filter with portions broken away for clearness in illustration.

Specifically describing the illustrated embodiment of the invention, the filter comprises a tank which includes a wall A that is preferably cylindrical, a bottom wall B at one end of the side wall and a removable dome-shaped cover C at the other end of the side wall and coaxial therewith. The side wall A and bottom wall B form the body portion of the tank that has a drain fitting D in its bottom and an inlet pipe E for liquid to be filtered connected to the side wall near the bottom of the tank. Adjacent to the upper end of the tank is connected a pressure gauge F. An outlet pipe G for the filtered liquid is connected to the cover C.

In accordance with the invention, novel and improved means is provided for separably connecting the cover C to the body portion of the tank and for clamping the tube sheet in fluid-tight relation to the cover and body portion of the tank. As shown, an angular flange H is rigidly and permanently secured to the exterior of the side wall A closely adjacent to the edge thereof, and a similar flange I is rigidly connected to the cover adjacent to the edge thereof. These flanges may constitute ordinary angle bars bent into annular form and welded to the respective side wall and cover so that the flanges extend perimetrally of the side wall and cover.

The angle bar H has one flange 1 secured to the exterior of the side wall and another flange 2 projecting from the side wall in a plane perpendicular to the axis of the side wall. Similarly, the angle bar I has one flange 3 secured to the exterior of the cover and another flange 4 projecting from the cover in a plane perpendicular to the axis of the cover. Each of the flanges 2 and 4 has a circular series of openings 5, each flange has the same number of openings so that when the flanges are brought into juxtaposed parallel relation as shown in FIGURES 3 and 4, each opening in the flange 4 may be brought into register with an opening in the flange 2 to receive the shank of the bolt 6 which has a head at one end to abut one flange and a nut 7 screwed on the other end to abut the other flange, thereby to permit the two flanges to be clamped together with a tube sheet 8 and gaskets or packing rings 9 and 10 clamped between them.

The tube sheet 8 has a hole 11 therethrough for each of a plurality of filter tubes 12 each of which has a metal flange 13 at its upper end, and between each flange and the tube sheet is a packing ring 14. The filter tubes are of known porous construction, generally formed of wire gauze, and in accordance with the invention, the tubes are separably attached to the tube sheet by a hold-down plate 15 that abuttingly overlies the flanges 13 at the sides thereof opposite the tube sheet and is secured to the tube sheet cap screws 16 fitted into holes 16a in the tube sheet so that the tubes are firmly gripped and held between the tube sheet and the hold-down plate. The hold-down plate has a plurality of openings 17 each to register with one of the filter tubes.

FIGURE 5 shows the parts in exploded or unassembled relation, while FIGURE 4 shows the parts assembled and clamped together.

The outer diameter of the gaskets 9 and 10 and tube sheet 8 are approximately equal to the diameter of an imaginary circle concentric with and contacting the inner edges of the bolt holes 5 in the flanges 2 and 4. In assembling the parts, the gasket 9 is first laid on the flange 2 with its outer edge concentric with the series of bolt holes 5 and approximately flush with or tangential to the inner edges of said bolt holes, whereupon the tube sheet 8 is laid directly on top of the gasket 9 and concentric therewith. Then the filter tube gaskets 14 are placed on their respective filter tubes and the tubes are slipped through the openings 11 of the tube sheet. Then the hold-down plate is laid over the ends of the tubes and the hold-down bolts 16 are tightened evenly so as to firmly clamp the filter tubes between hold-down plate and the tube sheet with the gaskets 14 providing fluid-tight closure of the openings 11. Gasket 10 is laid on the tube sheet and the cover C is placed in position with its flange 4 resting on the upper gasket 10. The cover bolts 6 are then placed in position and the nuts thereon tightened uniformly so as to firmly press the gaskets and the tube sheet between the flanges 2 and 4 as best shown in FIGURES 1, 4, and 6.

With this construction, a fluid-tight joint is provided between the body portion A, the tube sheet 8, gaskets 9 and 10 and the cover C, so that liquid under pressure to be filtered may be introduced into the tank through the pipe E and forced through the porous filter tubes 12 to filter out the suspended matter in the liquid, after which the filtrate may pass from the upper ends of the filter tubes and to the outlet G.

The construction is simple, inexpensive and the parts can be easily assembled and disassembled. When the parts are assembled, the bolts 6 positively locate the tube sheet and hold it against sliding in its own plane, and the angle flanges obviate expensive machined and grooved rings that are commonly used. Furthermore, the tube sheet and the tubes can be easily and quickly removed as a unit from the tank and thereafter readily separated from each other by removal of the hold-down plate 15. Inspection, replacement or cleaning of the tubes can be effected with a minimum of trouble and skill, and upon removal of the cover and the tube sheet, the tank can be easily cleaned, thereby eliminating the necessity for a separate clean-out door in the side wall.

To resist the pressure of the liquid on the tube sheet and hold-down plate, a strut 18 may be secured at one end to the underside of the cover C with its other end in closely spaced relation to the hold-down plate as shown in FIGURE 3.

While it is not necessary, it may be desirable to arrange the flanges 2 and 4 so that the edges 2a and 4a of the respective side wall and cover project beyond the flanges 2 and 4 and may press into the gaskets and enhance the tightness of the joint between the cover, the side wall, the two gaskets and the tube sheet.

It is another feature of the invention that a cooling coil (20) is mounted directly on and within the cover C for cooling the filtrate liquid or vapor. As shown, the coil comprises a length of tube spirally coiled with all convolutions in a common plane and with its ends extending outwardly through the cover as indicated at 21—22 for connection to supply pipes for a cooling liquid. Preferably the convolutions of the coil will have heat radiating fins 23. The coil is arranged concentrically in the cover so as to lie in closely spaced relation to the hold-down plate when the parts are assembled as shown in FIGURE 3 whereby the filtrate emerging from the upper ends of the filter tubes will pass over and into contact with the coil as the filtrate flows to the outlet G of the tank. The invention thus provides a simple and effective filtrate cooling device which can be handled with the cover as a unit, and the necessity for connection of cooling apparatus in the filtrate outlet line outside the tank is wholly eliminated.

While the now preferred embodiment of the invention has been shown and described, it should be understood that this is primarily for the purpose of illustrating the principles of the invention and that many modifications and changes can be made in the structural details of the filters within the spirit and scope of the invention.

What is claimed is:

1. A pressure type filter comprising a tank having a side wall provided with an inlet, a bottom wall at one end thereof and a separable dome-shaped cover at the other end of the side wall and provided with an outlet, there being a perimetral flange encircling and secured exteriorly to each of the second-mentioned end of the side wall and the edge portion of the cover, there being a perimetral flange projecting integrally outwardly from each of the first-mentioned flanges, a gasket in abutting relation to each of the second-mentioned flanges, a tube sheet carrying filter tubes and having its marginal portion disposed between said gaskets, and adjustable fastening elements connecting said second-mentioned flanges together to clamp said gaskets and tube sheet with a fluid-tight joint between said cover and said side wall, said side wall and said cover being formed of sheet metal and each of said flanges constituting one flange of an angle bar that has been bent into annular form and has its other flange rigidly secured to the respective cover and side wall, the edges of said cover and of said side wall extending beyond the planes of the respective first-mentioned flanges, and said gaskets being placed over said edges of the cover and the side wall respectively, providing for pressing of said edges into said gaskets when said fastening elements are tightened to enhance the fluid-tight joint.

2. A pressure type filter comprising a tank having a side wall providing with an inlet, a bottom wall at one end thereof and a separable dome-shaped cover at the other end of the side wall and provided with an outlet, there being a perimetral flange encircling and secured exteriorly to each of the second-mentioned end of the side wall and the edge portion of the cover, there being a perimetral flange projecting integrally outwardly from each of the first-mentioned flanges, a gasket in abutting relation to each of the second-mentioned flanges, a tube sheet carrying filter tubes and having its marginal portion disposed between said gaskets, and adjustable fastening elements connecting said second-mentioned flanges together to clamp said gaskets and tube sheet with a fluid-tight joint between said cover and said side wall, said side wall and said cover being formed of sheet metal, the edges of said cover and of said side wall extending beyond the planes of the respective first-mentioned flanges, and said gaskets being placed over said edges of the cover and the side wall respectively, providing for pressing of said edges into said gaskets when said fastening elements are tightened to enhance the fluid-tight joint.

References Cited in the file of this patent

UNITED STATES PATENTS

| | | |
|---|---|---|
| 418,148 | Andre | Dec. 31, 1889 |
| 1,823,171 | Hele-Shaw et al. | Sept. 15, 1931 |
| 1,992,101 | Stuart | Feb. 19, 1935 |
| 2,090,497 | Brown | Aug. 17, 1937 |
| 2,294,107 | Beck | Aug. 25, 1942 |
| 2,337,893 | Hutterer | Dec. 28, 1943 |
| 2,562,699 | Cooperson et al. | July 31, 1951 |
| 2,625,273 | Schuller | Jan. 13, 1953 |
| 2,714,455 | Galloway | Aug. 2, 1955 |
| 2,859,876 | Brundage | Nov. 11, 1958 |
| 2,904,184 | Daley et al. | Sept. 15, 1959 |

FOREIGN PATENTS

| | | |
|---|---|---|
| 6,760 | Great Britain | 1909 |
| 6,958 | Great Britain | 1913 |
| 1,606 | Switzerland | Dec. 3, 1889 |